United States Patent [19]
McIntire et al.

[11] Patent Number: 5,281,799
[45] Date of Patent: Jan. 25, 1994

[54] APPARATUS AND METHOD FOR THE XEROGRAPHIC PRINTING OF INFORMATION CARDS

[75] Inventors: Harley J. McIntire; Stevenson M. Givens, both of Columbus; James P. Harman, Jr., Greenville, all of Ga.

[73] Assignee: American Family Life Assurance Company of Columbus, Columbus, Ga.

[21] Appl. No.: 75,675

[22] Filed: Jun. 11, 1993

Related U.S. Application Data

[62] Division of Ser. No. 901,863, Jun. 22, 1992.

[51] Int. Cl.$^5$ .................. G06K 3/00; B42D 19/00; G11B 5/00; B41J 11/00
[52] U.S. Cl. ........................... 235/380; 281/2; 281/5; 400/105; 400/523; 360/2
[58] Field of Search ............... 281/2, 5; 235/375, 380; 400/105, 523

[56] References Cited

U.S. PATENT DOCUMENTS

| | | | |
|---|---|---|---|
| 3,697,101 | 10/1972 | Loos et al. | 281/5 |
| 4,194,685 | 3/1980 | Hill et al. | 235/375 |
| 4,384,196 | 5/1983 | McCumber et al. | 235/375 |
| 4,460,676 | 7/1984 | Fabel | 281/2 |
| 4,542,286 | 9/1985 | Golarz | 281/2 |
| 4,636,099 | 1/1987 | Goldstone | 281/2 |
| 4,708,503 | 11/1987 | Poor | 281/2 |
| 4,813,799 | 3/1989 | Dickey | 400/523 |
| 4,843,220 | 6/1989 | Haun | 235/380 |
| 4,905,392 | 3/1990 | Klein | 281/5 |
| 4,925,716 | 5/1990 | Haas | 281/2 |
| 5,012,073 | 4/1991 | Hewitt et al. | 235/375 |

Primary Examiner—John Shepperd
Assistant Examiner—Yu S. Lin
Attorney, Agent, or Firm—Hopkins & Thomas

[57] ABSTRACT

A card assembly permits xerographic printing of information cards, such as identification or authorization cards. The card assembly comprises a carrier sheet having a cavity. An information card is detachably bonded within the cavity. The foregoing card assembly can be passed through any conventional xerographic printer so that the information card can be printed with high quality xerographic print. The card assembly may be forwarded to the designated cardholder as an attractive package. Furthermore, a xerographic printer or other apparatus is provided with a magnetic encoder which is adapted to encode a magnetic strip situated on the card assembly passing through the xerographic printer or apparatus. Finally, a bar code may be disposed on the card assembly for encoding information regarding the card assembly and/or information card. The magnetic strip may be encoded in accordance with information decoded from the bar code.

7 Claims, 10 Drawing Sheets

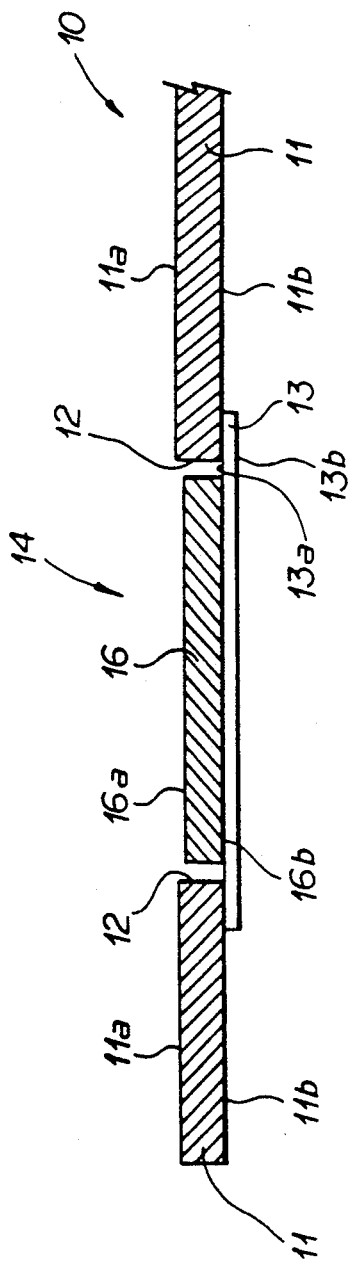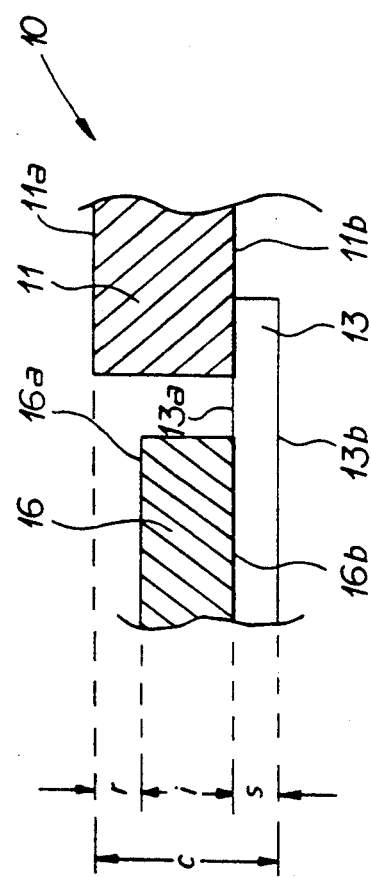

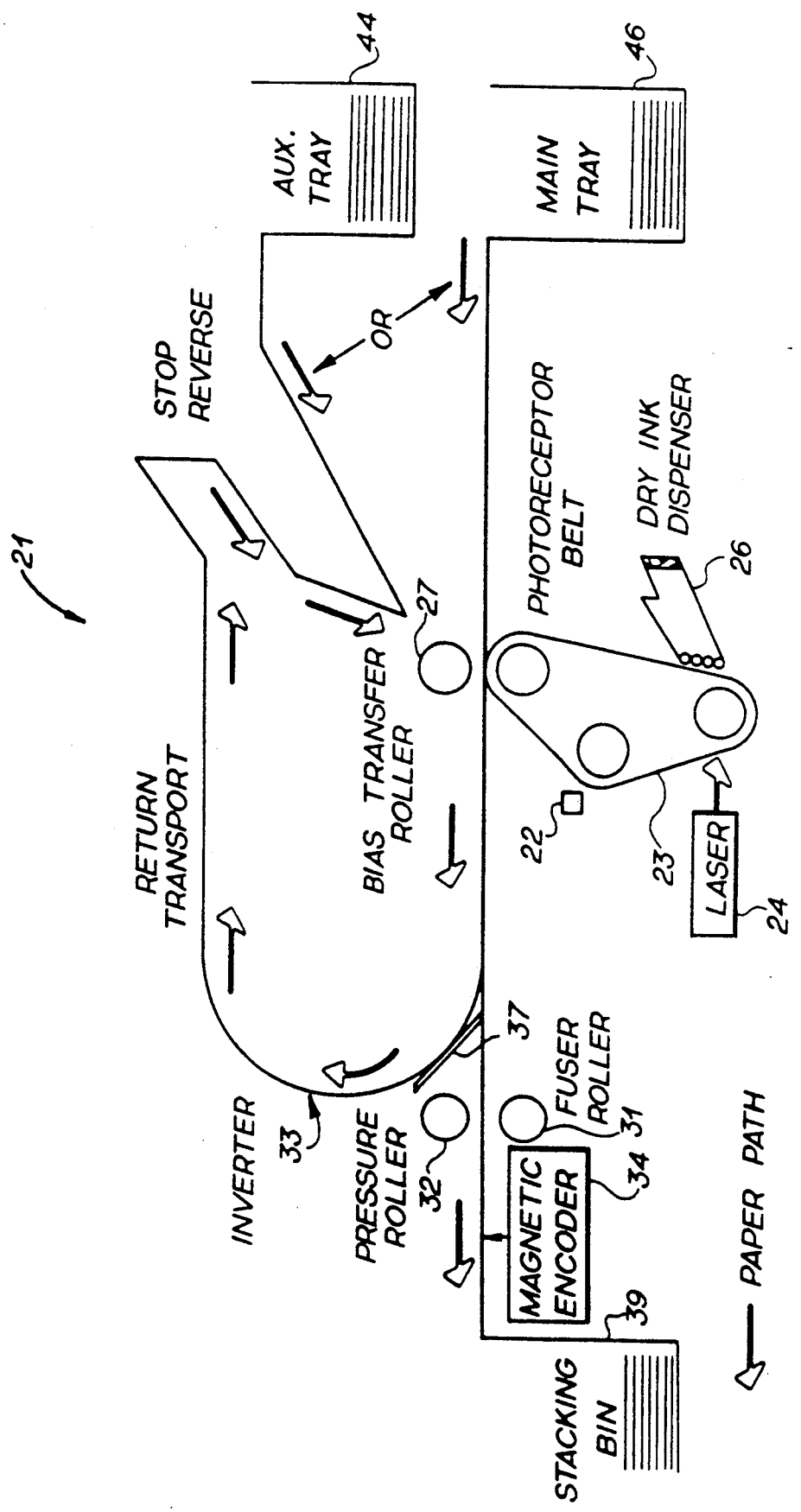

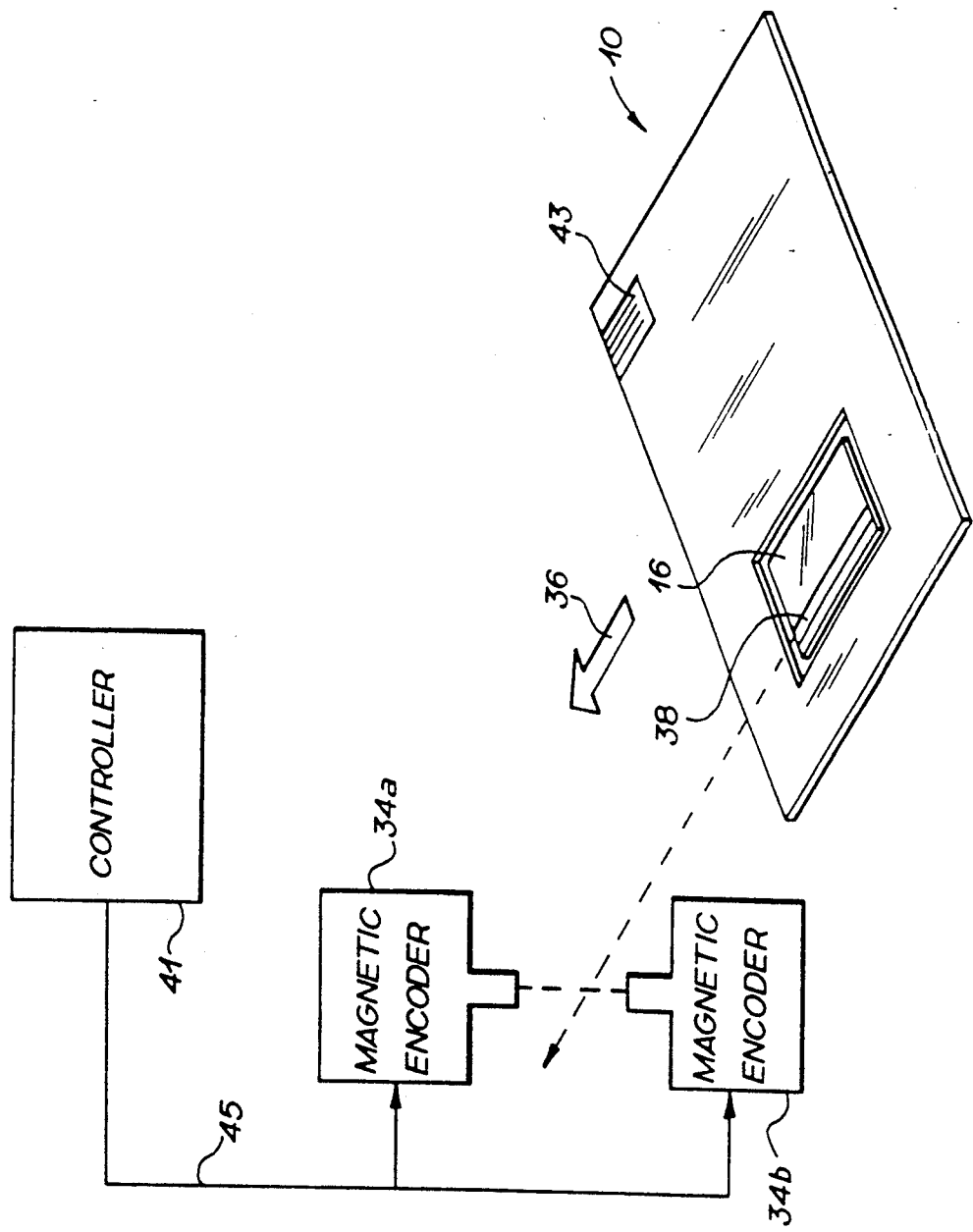

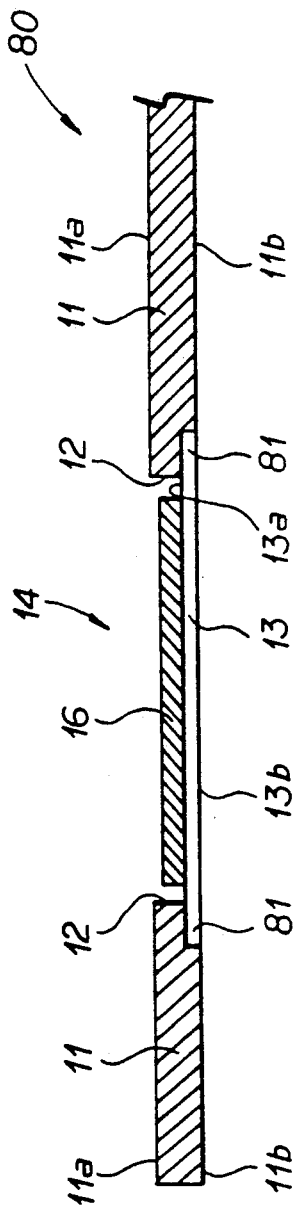
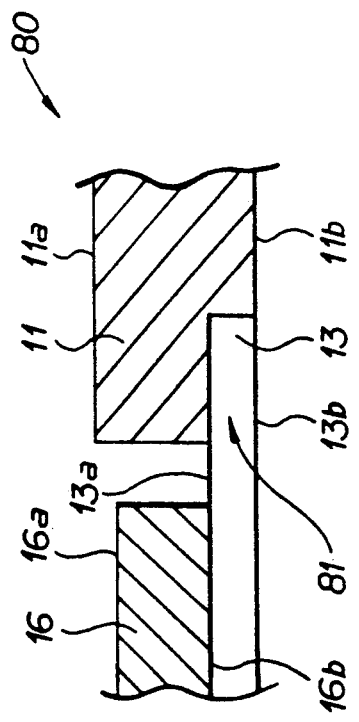
FIG 7A
FIG 7B

ID="5,281,799"

APPARATUS AND METHOD FOR THE XEROGRAPHIC PRINTING OF INFORMATION CARDS

This is a divisional of copending U.S. application Ser. No. 07/901,863 filed on Jun. 22, 1991, pending.

BACKGROUND OF THE INVENTION

I. Field of the Invention

The present invention generally relates to information cards, such as identification or authorization cards, and more particularly, to a card assembly and methodology for permitting high quality xerographic printing of information cards.

II. Related Art

The use of information cards has become an integral part of our society. In the context of this document, information cards include any form of identification or authorization card, for example, credit cards, check cards, automatic teller machine (ATM) cards, membership cards, department store cards, insurance policyholder cards, or the like. It is estimated that over 400 million information cards are produced and distributed annually in the U.S. alone, and this estimation is expected to substantially increase in the years to come.

At present, information cards are produced in a variety of constructions. One type, considered the high end of the industry, is fabricated from a rigid, thick plastic or vinyl material, and comprises embossed alphanumeric data for customization to a particular cardholder. Embossing is implemented either by raising or by depressing personalized data in the information card. Embossing is desireable because embossing provides for virtually tamper-proof customization.

The printing of artwork, designs, and other information are placed on the embossed information cards by the card manufacturer via a variety of complex techniques, which are well known in the art. One such technique is described in U.S. Pat. No. 4,650,350 to Dorner, which is incorporated herein by reference as if set forth in full hereinbelow.

The embossed information cards offer many advantages. Most significantly, they are extremely durable and virtually tamper-proof. However, these information cards are bulky, expensive to manufacture, and require the use of an expensive embossing machine or embossing service in order to ultimately customize the information cards with pertinent cardholder information before distribution of the cards.

Another type of information card construction, considered the low end of the industry, comprises merely a piece of paperboard which may be laminated, if desired, with a protective coating for protection against moisture or other destructive exposure. To fabricate this type of information card, a piece of paperboard stock is die cut to form a card, or perforations defining numerous cards are imposed in a large paperboard sheet. Designs and/or other information are then printed onto the surfaces of the card(s). Next, the card(s) is laminated, if desired, with a clear plastic protective coating.

The paperboard information cards are often desirable for certain applications because they are inexpensive to manufacture, are flexible, and exhibit a very thin cross section. Because of the flexibility and thin cross section, many of these cards can be placed in a wallet with less bulk and more comfort than the embossed information cards. However, these information cards are problematic in that they are not durable. They ultimately become dilapidated and unsightly due to continuous bending. Also, if the information cards are taken from a perforated larger paperboard sheet during manufacture, the edges of these cards do not have the protective coating and, therefore, are eventually harmed by moisture or the like.

Yet another type of information card which has become popular in recent years comprises a thin plastic sheet. During construction of this type of card, designs and other pertinent information are provided via printing operations and then subsequent curing or lamination processes, which are well known in the art. The thin plastic information cards have the advantages of low cost, durability, flexibility, and very thin cross section. As a result of these many advantages, the trend in the industry appears to be toward adoption of this type of card construction for most applications.

Furthermore, all the aforementioned cards, i.e., the embossed, thin plastic, and paperboard information cards, can be provided with laminate, customization surface layers which are bonded to the outer surface of the information cards by the manufacturer of the cards. A customization surface layer is a blank region, usually white in color but may include any color tint or any void feature of under-printing beneath the print panel, for permitting certain information to be affixed to the information card after manufacture. For example, a cardholder's signature can be preserved on the information card on a customization surface layer. Moreover, a customization surface layer can receive and preserve print from an impact printer, for example, a conventional dot matrix printer.

However, as is generally known in the art, information printed to the customization surface layers of information cards by impact printing is of low quality, often smears, and is considered unsightly for many applications. The printing capability, versatility, and speed of impact printers is also inferior to a certain extent in comparison to those printers which utilize a xerographic process, including for example, the process of laser printing. Thus, a need exists in the industry for a technique to provide better quality printing to customization surface layers of information cards during post-processing steps.

SUMMARY OF THE INVENTION

Accordingly, an object of the present invention is to overcome the deficiencies and inadequacies of the prior art as described above.

Another object is to provide a card assembly and method for permitting high quality xerographic printing of information cards.

Another object of the present invention is to provide a card assembly and method for efficiently carrying an information card through any conventional printer employing the xerographic process so that the information card can be provided with high quality print and/or designs.

Another object of the present invention is to provide a card assembly and method for inexpensively printing information cards with high quality print and/or designs.

Another object of the present invention is to provide a card assembly for carrying an information card through a printer or copier, which card assembly is durable in structure, efficient in operation, and easily manufactured on a mass scale.

Another object of the present invention is to provide a method for magnetically encoding information cards before, during, or after xerographic printing of the same.

Another object of the present invention is to provide a method for tracking and identifying card assemblies before, during, and/or after xerographic printing of the same.

Another object of the present invention is to provide an attractive card assembly which can be forwarded to the designated cardholder after xerographically printing the information card as well as one or both surfaces of the card assembly.

Broadly stated, the present invention involves a novel card assembly for permitting xerographic printing of information cards. The card assembly has a carrier sheet with a cavity within a surface. An information card is detachably bonded within the cavity so that the information card is either flush with or recessed from the surface of the carrier sheet. Because of the cavity, the information card can be passed through any conventional xerographic printer so that both the information card and the surrounding carrier sheet may receive print and/or designs from the xerographic printer. Three specific embodiments of the novel card assembly are briefly described below.

In a first embodiment of the novel card assembly, the cavity is formed via an aperture in the carrier sheet with a suspension sheet affixed to the carrier sheet over the aperture. The suspension sheet and the aperture collectively define the cavity. An information card is detachably bonded within the cavity to the suspension sheet. The suspension sheet may be a transparent material so that the bottom side of the information card can be readily observed.

In a second embodiment of the novel card assembly, the cavity is formed via an aperture in the carrier sheet with a suspension sheet affixed to the carrier sheet over the aperture. However, unlike the first embodiment, the second embodiment has a periphery recess in the carrier sheet around the aperture so that the suspension sheet is bonded flush with the carrier sheet bottom surface. As a result, the card assemblies of the second embodiment can be better stacked.

In a third embodiment of the novel card assembly, the cavity is formed directly in the carrier sheet so that the information card is detachably bonded to part of the carrier sheet. Such a card assembly configuration results in less expense.

In accordance with another embodiment of the present invention, a xerographic printer for receiving the novel card assembly is provided with a magnetic encoder. The magnetic encoder is adapted to encode a magnetic strip situated on the information card passing through the xerographic printer within the card assembly.

In accordance with still another embodiment of the present invention, the novel card assembly is provided with a bar code on the carrier sheet. The bar code is read and decoded by a bar code decoder. Information decoded from the bar code can be used to track and identify the card assembly and/or information card. The decoded information can also be used to magnetically encode customized information onto the information card. Moreover, the magnetic encoding process can occur before, during, or after xerographic printing of the card assembly and/or the corresponding information card.

In accordance with yet another embodiment of the present invention, a decoder/encoder apparatus is provided having both a bar code decoder and a magnetic encoder. The decoder/encoder apparatus decodes a bar code on an incoming card assembly via the bar code decoder, and then encodes information on the corresponding information card of the card assembly via the magnetic encoder in accordance with the decoded information.

Other objects, features and advantages of the present invention will become apparent from the following description when considered in conjunction with the accompanying drawings.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

FIG. 2A illustrates a cross-sectional view of a first embodiment of the card assembly of FIG. 1 taken along line 2'—2';

FIG. 2B illustrates a partial exploded view of FIG. 2A;

FIG. 3A illustrates a schematic view of a xerographic printer for receiving the card assembly of FIG. 1 in accordance with the present invention;

FIG. 3B illustrates schematically the travel path of the card assembly of FIG. 1 through the xerographic printer of FIG. 3A relative to the placement of the magnetic encoder;

FIG. 7A illustrates a cross-sectional view of a second embodiment of the card assembly of FIG. 1 taken along line 2'—2';

FIG. 7B illustrates a partial exploded view of FIG. 7A; and

DETAILED DESCRIPTION OF THE PREFERRED EMBODIMENT

Figure 1:
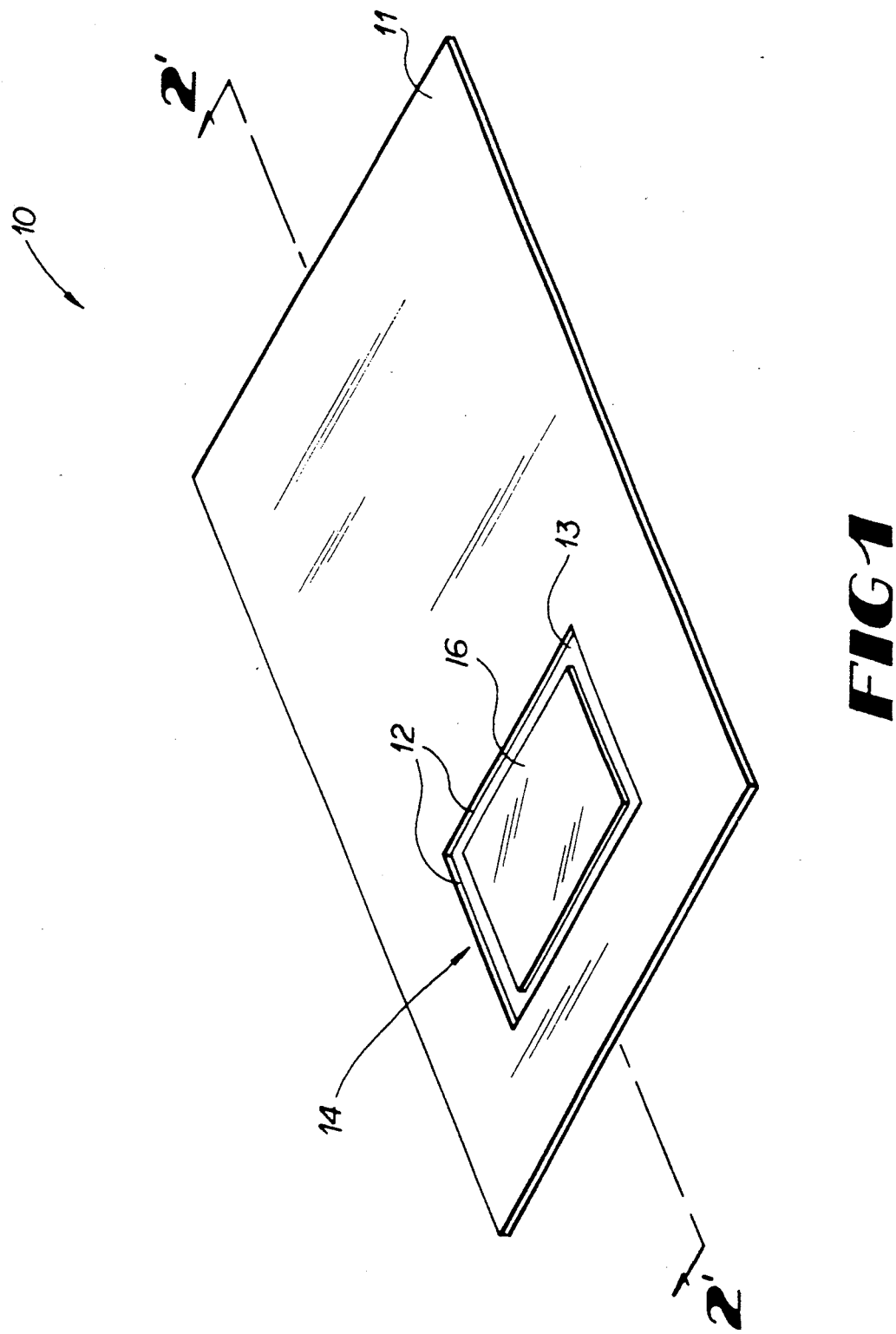
FIG. 1 illustrates a perspective view of the card assembly in accordance with the present invention.

With reference to the figures wherein like reference numerals designate corresponding parts throughout the several views, a novel card assembly 10 shown in FIG.

1 comprises a carrier sheet 11 having a cavity 14 and an information card 16 detachably bonded at its bottom surface within the cavity 14. The information card 16 is bonded within the cavity 14 so that the top surface of the information card 16 is either flush with or recessed from the top surface of the carrier sheet 11. As a result, the card assembly 10 can be passed through any conventional xerographic printer in any direction so that the top surface 16a of the information card 16 and surrounding top surface 11a of the carrier sheet 11 may be efficiently and inexpensively printed with high quality xerographic print and/or designs. If the xerographic printer has duplex capabilities, the bottom surface of the carrier sheet 11 may also be xerographically printed, if desired.

FIG. 2A shows a cross-sectional view of a first embodiment of the novel card assembly 10 taken along line 2'—2' of FIG. 1. As shown in FIG. 2A, the novel card assembly 10 comprises a carrier sheet 11 having an aperture 12, a suspension sheet 13 affixed to the bottom surface of the carrier sheet 11 to thereby define the cavity 14, and the information card 16 detachably bonded at its bottom surface within the cavity 14 to the suspension sheet 13. The suspension sheet 13 completely supports the information card 16.

In composition, the carrier sheet 11 is preferably a paper product, such as paperboard stock, but could be any material capable of passage through a conventional printer. The suspension sheet 13 is preferably a thin plastic film, for instance, a transparent acetate material or a glassine material. The transparency of the suspension sheet 13 permits easy viewing of the bottom surface 16b of the information card 16. However, as is obvious, the suspension sheet 13 need not be transparent to practice the present invention and could be produced from a variety of alternative materials. Furthermore, the composition of the information card 16 is preferably 0.008 PVC vinyl with a 0.001 laminate customization surface layer on the top surface 16a to be xerographically printed. The information card 16 can be produced from any plastic material, paperboard material, or a variety of other suitable materials.

The suspension sheet 13 is adhered to the carrier sheet 11 via any conventional bonding mechanism, cement, or adhesive, for example, white glue. Furthermore, the information card 16 is detachably bonded to the suspension sheet 13 via any conventional bonding mechanism, cement, or adhesive, for example, a formulated rubber latex adhesive, product #35-6196, manufactured by and commercially available from National Starch and Chemical, Inc., U.S.A. The glue compound for adhering the information card 16 to the suspension sheet 13 should be durable enough to maintain the information card 16 in engagement with the suspension sheet 13 while the card assembly 10 is passed through a conventional xerographic printer, but must be capable of being peeled from the suspension sheet 13 without tearage or other adverse damage to the information card 16 after processing in the xerographic printer.

The thicknesses of the carrier sheet 11, the information card 16, and the suspension sheet 13 depend in large part on the type of xerographic printer utilized. In the preferred embodiment, a conventional Model 4135, Model 4090, or Model 9790 xerographic printer manufactured by Xerox Corporation, New York, U.S.A., is employed for accepting the card assembly 10. Accordingly, in the preferred embodiment of the card assembly 10, as shown in partial exploded view in FIG. 2B, the thickness of carrier sheet 11 measures 0.004-0.009 inches (i.e., paper weight 20#-110#). Further, the thickness i of the information card 16 measures approximately 0.008-0.010 inches, while the thickness s of the suspension sheet 13 measures approximately 0.001-0.002 inches. For best results, the top surface 16a of the information card 16 should be flush with or recessed from the top surface 11a of the carrier sheet 11, as indicated by recess r in FIG. 2B. This disposition prevents the information card 16 from being pealed off while the card assembly 10 passes through a xerographic printer.

A xerographic printer for receiving the card assembly 10 is shown in FIG. 3A. The process of xerographic printing is well known in the art. For purposes of discussion, a brief overview of the process is described hereafter.

The conventional xerographic process involves the following steps: (1) charge; (2) expose; (3) develop; (4) transfer; and (5) fuse. During the charge step, a charge corotron 22 gives a photoreceptor belt 23 a positive charge. The photoreceptor belt 23 is then ready for the expose step. In the expose step, a laser 24 or other light source exposes the photoreceptor belt 23 to light that eliminates the positive charge on the photoreceptor belt 23. The laser 24 exposes those areas which will not be imaged. This leaves the photoreceptor belt 23 with a positive charge in only those areas that will be imaged on the paper. In the develop step, ink is carried toward the belt by a dry ink dispenser 26. The ink is negatively charged. The ink is brushed against the photoreceptor belt 23 so that the belt 23 has a positive charge only on those areas which should be imaged. The ink, with its negative charge, sticks to the positive areas on the belt 23. During the transfer step, the paper travels over the top of the photoreceptor belt 23, and the image is transferred from the belt 23 onto the paper. This transfer is assisted by the bias transfer roll (BTR) roller 27, which places a strong positive charge on the paper, thereby causing the negative ink to be attracted to the paper. The image is now on the paper as a loosely attached, powdery ink. During the fuse step, heat and pressure imposed by a respective fuser roller 31 and a pressure roller 32 cause the fusion of ink and paper. Hence, the ink is no longer powdery and it stays firmly on the paper.

When the xerographic printer 21 is operating in simplex mode, the paper is printed on only one side. In a duplex mode, the xerographic printer prints on both sides of the paper by inverting the paper after a first pass over the photoreceptor belt and then passing the paper once again over the photoreceptor belt. The inversion is accomplished via an inverter 33, as shown in FIG. 3A.

In operation, the card assembly 10 of the present invention is inserted into the xerographic printer 21 with the cavity 14 and surface 11a facing downwardly toward the photoreceptor belt 23 so that the customization surface layer of the information card 16 is directly exposed to the photoreceptor belt 23 as the card assembly 10 travels through the xerographic printer 21. The total allowable thickness (c and i+s) for the card assembly 10 is dictated in large part by the separation between the bias transfer roller 27 and the photoreceptor belt 23 as well as the separation between the pressure roller 32 and the fuser roller 31. The photoreceptor belt 23 can cause print to be placed on both the information card 16 and the surrounding carrier sheet 11.

If desired, during operation the card assembly 10 can be inverted by the inverter 33 so that the other side of the carrier sheet 11 may be xerographically printed. However, the information card 16 should be sufficiently flexible to permit inversion without causing the card 16 to be detached from the suspension sheet 13.

In accordance with another embodiment of the present invention, a magnetic encoder 34 may be positioned within the xerographic printer 21, as shown in FIG. 3A. The magnetic encoder 34 can magnetically encode a magnetic strip 38 disposed on the information card 16. The magnetic encoder 34 is preferably positioned near the output of the xerographic printer 21, as shown. However, it should be noted that the magnetic encoder 34 can be disposed virtually anywhere along the paper path inside the xerographic printer or even in an entirely different machine altogether. Machines specifically dedicated to magnetic encoding of information cards is well known in the art.

FIG. 3B shows the necessary alignment between the magnetic strip 38 on the information card 16 and a possible magnetic encoder system having a top magnetic encoder 34A and a bottom magnetic encoder 34B. The magnetic encoders 34A, 34B receive control signals, as indicated by arrow 45, from a controller 41. The controller 41 can be the printer controller which controls the various components of the xerographic printer 21, as described above with respect to FIG. 3A. Two magnetic encoders 34A, 34B are preferably provided so that the magnetic strip 38 on either surface 16a, 16b of the information card 16 can be magnetically encoded. Worth noting is that the magnetic field generated by the magnetic encoders 34A, 34B can penetrate, if necessary, through the suspension sheet 13, to thereby encode the magnetic strip 38. As illustrated by phantom lines in FIG. 3B, the magnetic encoders 34A, 34B are mounted so that when the card assembly 10 passes through the xerographic printer 21, as indicated by arrow 36, the magnetic strip 38 of the information card 16 travels adjacent to and in line with the magnetic head of the corresponding magnetic encoder 34A, 34B.

It is envisioned that the magnetic encoders 34A, 34B can be adjustably mounted so that different card assemblies 10 having varying cavity positions may be accommodated. Further, adjustment of the encoder positions could be accomplished via electronically-controlled driving means under the control of the controller 41.

A wide variety of commercially available magnetic encoders 34A, 34B are known in the art and can be utilized to implement the present invention. For example, a Model 582030-003 magnetic head assembly manufactured by Data Card, Inc., U.S.A., can be utilized to implement the magnetic encoders 34A, 34B.

In accordance with another embodiment of the present invention, the novel card assembly 10 is provided with a bar code 43 on the carrier sheet 11. The bar code 43 is read and decoded by any conventional bar code decoder. Information decoded from the bar code 43 can be used to track and identify the card assembly 10. The decoded information can also be used to select particular information to be printed on the card assembly 10 or to magnetically encode customized information on the magnetic strip 38 of the information card 16.

Figure 4A:
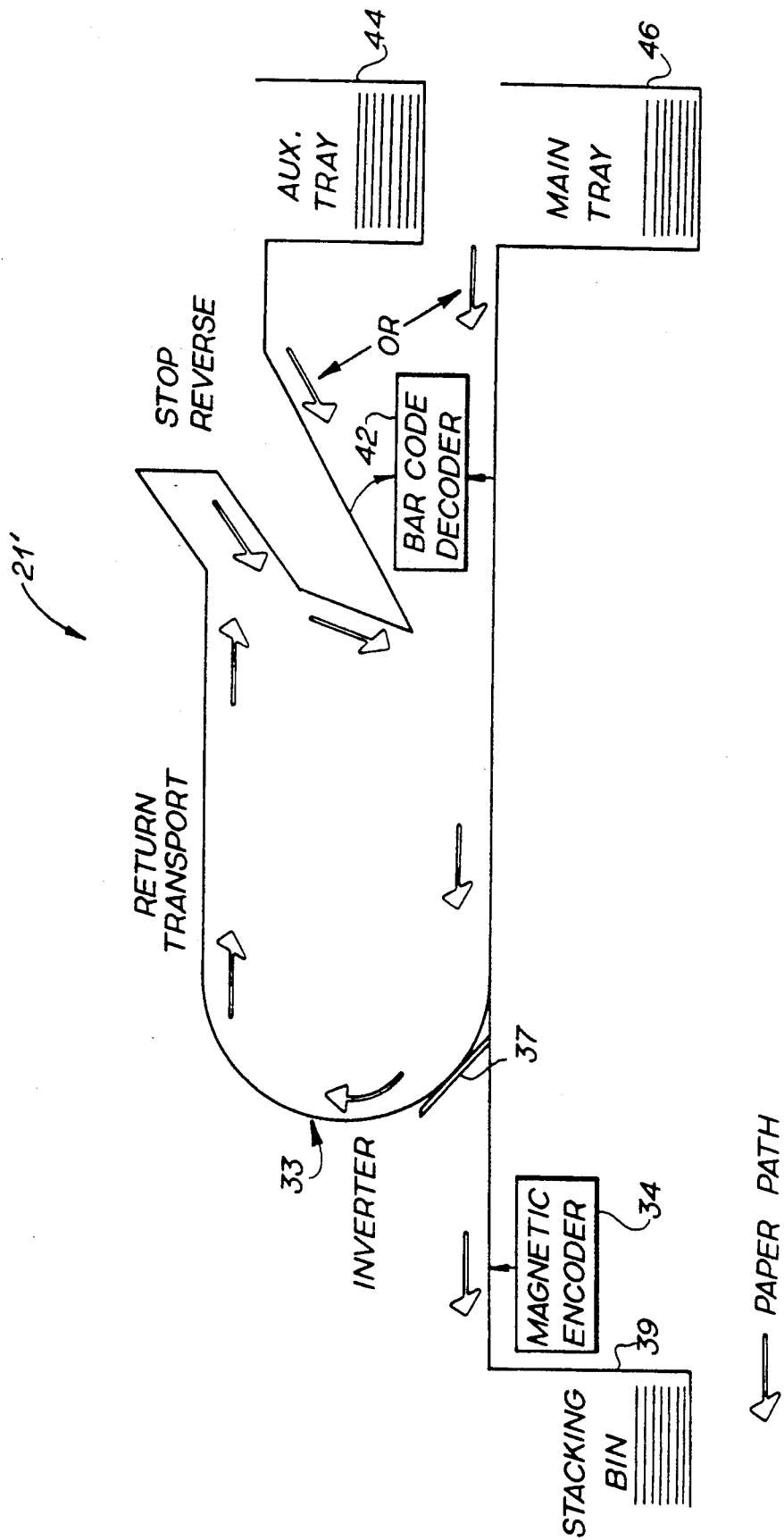
FIG. 4A illustrates a schematic view of an decoder/encoder apparatus for receiving the card assembly of FIG. 1 in accordance with the present invention.

The present invention further provides for a decoder/encoder apparatus 21', illustrated in FIG. 4A, which decodes the bar code 43 on the card assembly 10 and then encodes information on the magnetic strip 38 of the information card 16 in accordance with the decoded information. The apparatus 21, can be positioned before or after the xerographic printer 21 so as to magnetically encode information on the information card 16 before or after the xerographic printing operation.

Structurally, the decoder/encoder apparatus 21' of FIG. 4A has a paper path similar to that of the xerographic printer 21 of FIG. 3A. The decoder/encoder apparatus 21' is provided with a bar code decoder 42 near the paper input and is provided with a magnetic encoder 34 near the paper output, as illustrated in FIG. 4A.

Figure 4B:
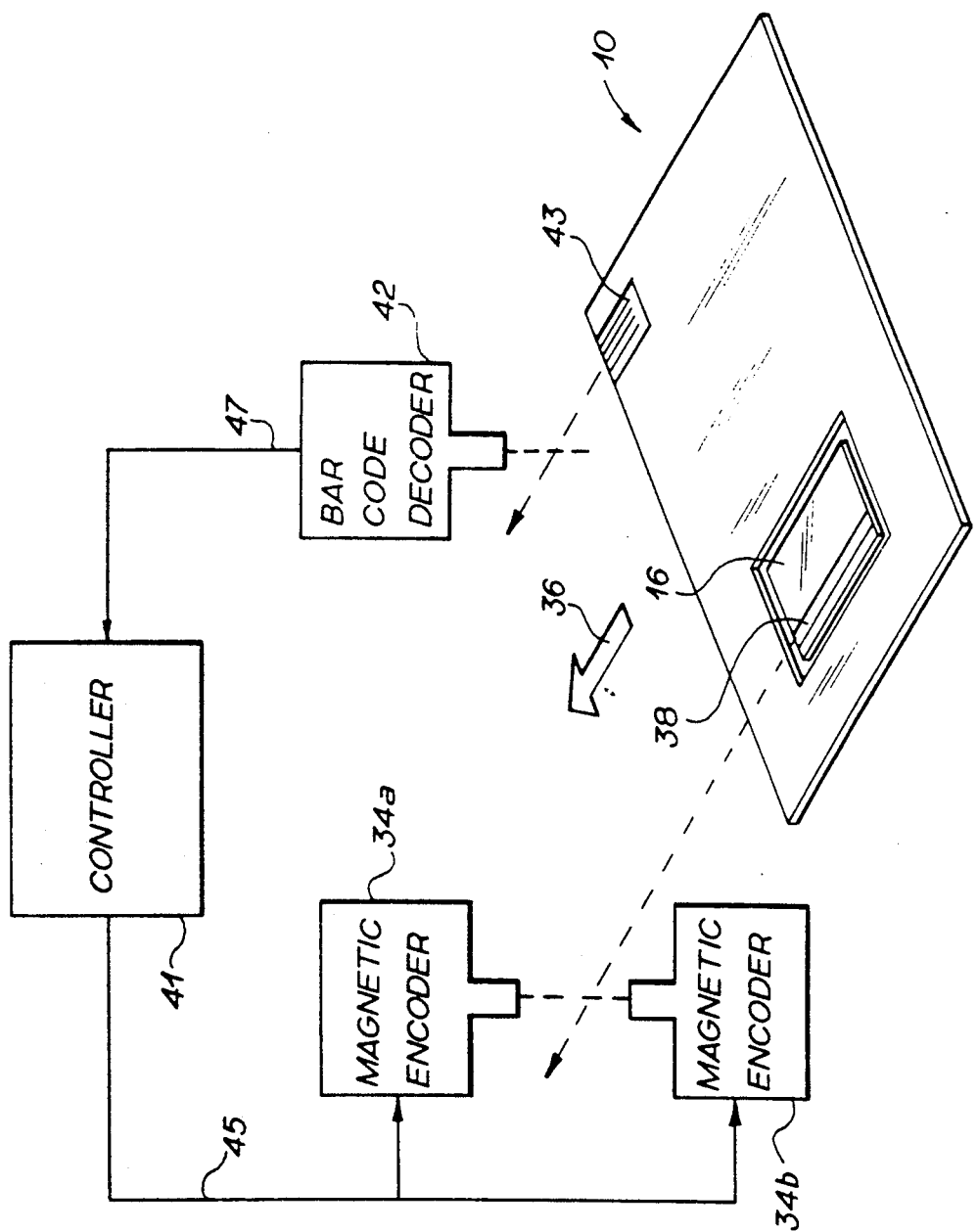
FIG. 4B illustrates schematically the travel path of the card assembly of FIG. 1 through the decoder/encoder apparatus of FIG. 4A relative to the placement of a bar code decoder and a magnetic encoder.

The bar code decoder 42 immediately reads a bar code on the card assembly 10 when the card assembly 10 is fed into the decoder/encoder apparatus 21'. One or more bar code decoders 42 can be disposed so that a bar code 43 can be read on a card assembly 10 input from either the auxiliary tray 44 or the main tray 46. Referring to FIG. 4B, the bar code decoder 42 is mounted so that as the card assembly 10 travels through the decoder/encoder apparatus 21', as indicated by arrow 36, the bar code 43 on the card assembly 10 passes adjacent and in line with the bar code decoder 42. Data which is read and decoded by the bar code decoder 42 is sent to a controller 41, as indicated by arrow 47. The information transmitted to the controller 41 from the bar code 43 can include specific information about the particular information card 16 and, significantly, specific information in regard to the encoding information for the magnetic strip 38 on the information card 16.

The bar code decoder 42 can be adjustably mounted so that different card assemblies 10 having varying bar code positions may be accommodated. Moreover, adjustment of the bar code decoder positions could be accomplished via electronically controlled driving means under the control of the controller 41.

A wide variety of commercially available bar code decoders are known in the art and can be utilized to implement the present invention. For instance, the bar code decoder 42 could be fabricated from a Model #2755-L5RAA scan head and a Model #2755-DM6 decoder, both manufactured by and commercially available from Allen-Bradley Inc., Milwaukee, WI, U.S.A.

For the same reasons discussed previously in relation to the xerographic printer 21, it is desirable to dispose two magnetic encoders 34A, 34B in the decoder/encoder apparatus 21', as shown in FIG. 4B. Essentially, with two magnetic encoders 34A, 34B, the magnetic strip 38 can be positioned and magnetically encoded on either surface 16a, 16b of the information card 16. The magnetic encoders 34A, 34B receive control signals from the controller 41, as shown by arrow 45 in FIG. 4B.

In operation, the card assembly 10 is first introduced into the decoder/encoder apparatus 21'. The bar code decoder 42 reads and decodes data on the bar code 43. This data is then sent to the controller 41. The controller 41 then commands the magnetic encoders 34A, 34B to encode certain information on the magnetic strip 38 of the information card 16 in response to the encoded data on the bar code 43.

Obviously, the card assembly 10 of FIG. 1 can be fabricated via a number of well known techniques. The card assembly 10 could even be constructed by first manually cutting the aperture 12 in the carrier sheet 11, then manually pasting the suspension sheet 13 onto the carrier sheet 11, and finally pasting the information card 16 onto the suspension sheet 13. However, such a rudimentary technique would be time consuming. In accordance with another feature of the present invention, a method is provided for mass production of the card assembly 10, thereby enabling the card assembly to be manufactured in a very cost effective and efficient manner. The method for mass production of the card assembly 10 of FIG. 1 is shown in FIG. 5 and described hereinafter.

Figure 5:
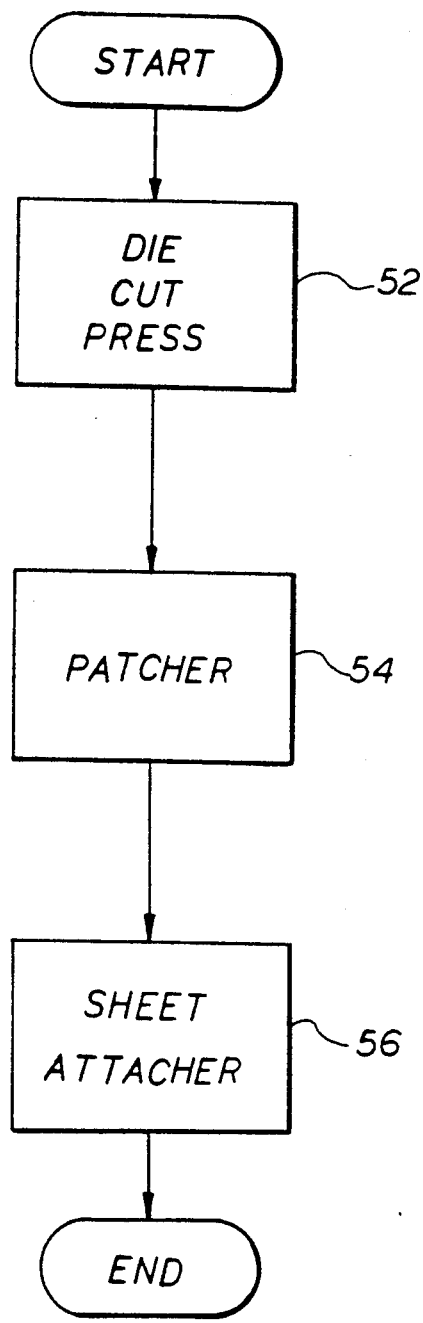
FIG. 5 illustrates a high level block diagram for the mass production of the card assembly shown in FIG. 1.

Referring to FIG. 5, a die cut press 52 is first used to cut the aperture 12 in the carrier sheet 11. The die cut press 52 is manufactured and commercially available from Consolidated Press Inc., Japan. Next, a patcher 54 is utilized to cut the suspension sheet 13 to the proper size and affix the suspension sheet 13 to the carrier sheet 11. The patcher 54 is manufactured and commercially available from International Inc., U.S.A. In the conventional art, the patcher 54 has been used to put windows in envelopes. Finally, a conventional sheet attacher 56 applies an adhesive to the suspension sheet 13 and then places the information card 16 onto the adhesive. The sheet attacher 56 is manufactured and commercially available from Ga,Vahren Inc., St. Louis, MO, U.S.A. In general, FIGS. 6A, 6B, 6C illustrate more specifically the processing steps which occur, respectively, in the die cut press 52, the patcher 54, and the sheet attacher 56, as described in more detail hereinafter.

Figure 6A:
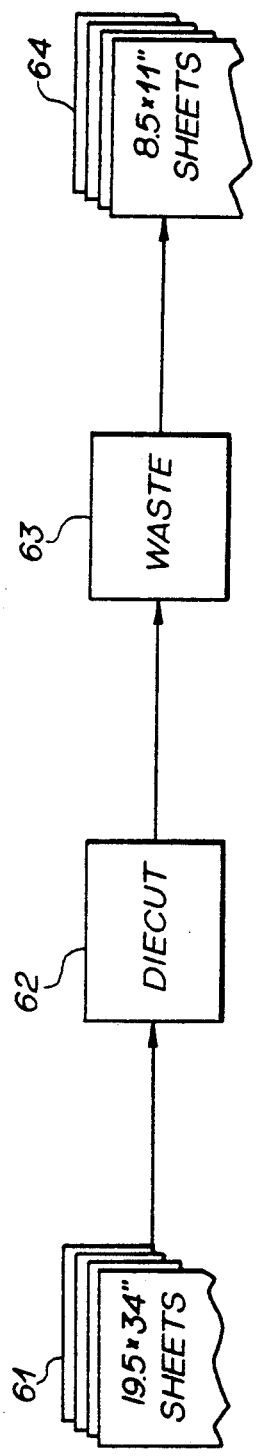
FIG. 6A illustrates a flow chart for the processing steps which occur within the die cut press indicated in FIG. 5.
Figure 6B:
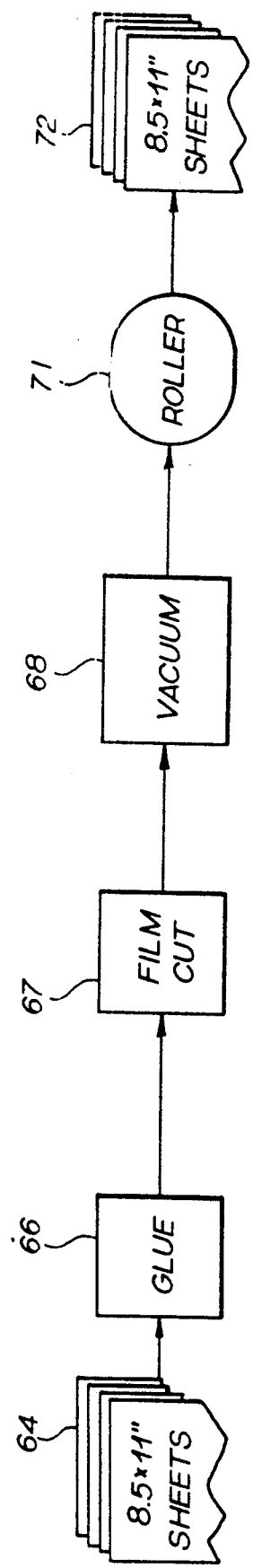
FIG. 6B illustrates a flow chart for the processing steps which occur within the patcher indicated in FIG. 5.
Figure 6C:
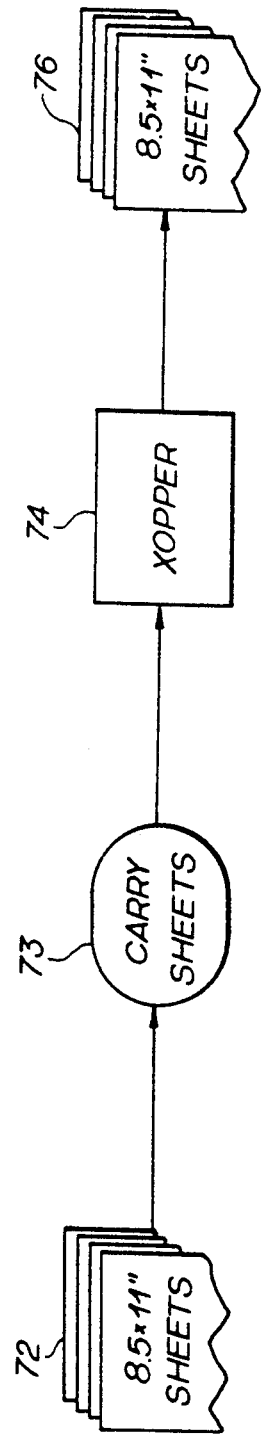
FIG. 6C illustrates a flow chart for the processing steps which occur within the sheet attacher indicated in FIG. 5.

With reference to FIG. 6A, the die cut press 52 receives paperboard sheets 61 measuring approximately 19.5×34 inches with a thickness of approximately 0.004-0.009 inches, as indicated by reference numeral 61. The 19.5×34 sheets 61 are then die cut and perforated to 8.5×11 sheets, as indicated by reference numeral 62. As indicated by reference numeral 63, the waste from the die cut operation is then removed. Finally, the 19.5×34 sheets are manually burst into 8.5×1 sheets, as shown by reference numeral 64.

Next, the 8.5×11 sheets are loaded into a hopper of the patcher 54. As indicated by reference numeral 66, a rubber plate with two glue rollers underneath applies glue to the tops of the 8.5×11 sheets. A roll of the suspension sheet 13 is then cut to form a suspension sheet 13 of appropriate size. The suspension sheet 13 is then vacuumed pulled to a corresponding 8.5×11 carrier sheet 11, as indicated by reference numerals 67, 68. Finally, horizontal rollers roll across the 8.5×11 carrier sheets 11 and the suspension sheet 13 so as to smooth glue lines.

The sheets 72 having the suspension sheet 13 are next fed into the sheet attacher 56. Referring to FIG. 6C, two round wheels carry the sheets 72 to an information card hopper and gluing apparatus, as indicated by reference numeral 73. Information cards drop one at a time from an information card hopper, as indicated by reference numeral 74, after an adhesive has been applied to the top surface 13a of the suspension sheet 13. As a consequence of the foregoing process, a stack of card assemblies is produced, as illustrated by reference numeral 76.

FIGS. 7A and 7B show cross-sectional views of a second embodiment of the novel card assembly, the second embodiment being generally denoted by reference numeral 80. As shown by FIGS. 7A and 7B, the bottom surface 13b of the suspension sheet 13 is situated flush with, or planar with respect to, the bottom surface 11b of the carrier sheet 11. The suspension sheet 13 is permitted to be affixed in a flush manner to the carrier sheet 11 by creating a periphery recess 81 in the bottom surface 11b of the carrier sheet 11 around the cavity 14 via a hammering process followed by a die-cutting process, which are well known in the art. In the preferred embodiment, the carrier sheet 11 is hammered to create the periphery recess 81 before the suspension sheet 13 is glued to the carrier sheet 11 as described with respect to FIG. 6B. An advantage of the second embodiment is that the card assemblies 80 can be more efficiently stacked. A stack of card assemblies 80 occupies less space and is more evenly stacked than a stack of card assemblies 10.

Figure 8:
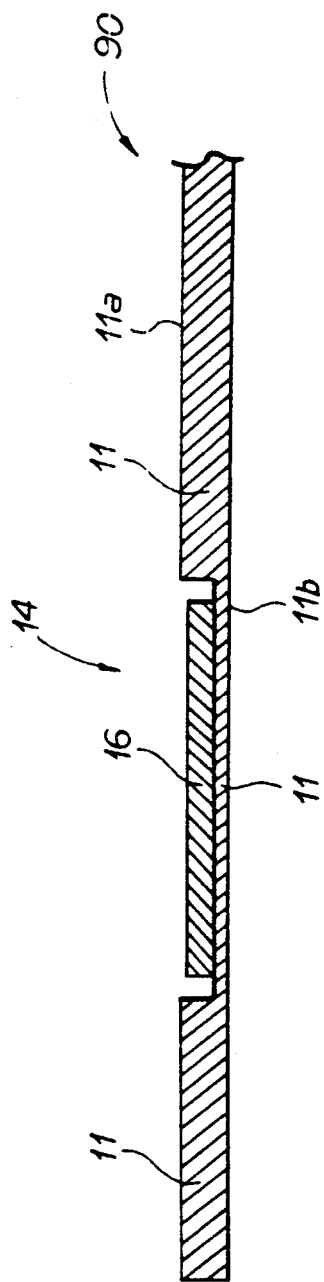
FIG. 8 illustrates a cross-sectional view of a third embodiment of the card assembly of FIG. 1 taken along line 2'-2'.

FIG. 8 shows a third embodiment of the present invention wherein the cavity 14 has been created directly in the carrier sheet 11. In the preferred embodiment, the cavity 14 is created via a hammering or other similar process. This hammering process is similar to the process for creating the periphery recess 81 in the second embodiment. In essence, the cavity 14 is hammered into the carrier sheet 11 so that the bottom surface 11b of the carrier sheet is totally planar. The information card 16 is then detachably affixed to the carrier sheet 11 by way of any conventional glue compound. The third embodiment may not be desirable for some applications because of the lack of transparency in the bottom suspension layer 11, adjacent the information card 16. However, the third embodiment is desirable in that the card assemblies 90 can be efficiently stacked and they require less construction materials.

It will be obvious to those skilled in the art that many variations may be made to the preferred embodiments described above without departing from the novel teachings of the present invention. For example, the card assembly in accordance with the first, second and third embodiments of the novel card assembly 10 could be created with any number of cavities 14 for housing a respective number of information cards 16 in order to provide concurrent xerographic printing of the same. All such variations are intended to be incorporated herein and within the scope of the present invention.

Wherefore, the inventors claims the following:

1. An apparatus comprising:
   a magnetic encoder adapted to encode a magnetic strip situated on a card assembly passing through said apparatus, said card assembly having:
   a carrier sheet having an aperture;
   a suspension sheet affixed to said carrier sheet over said aperture, said suspension sheet and said aperture collectively defining a cavity; and
   an information card detachably bonded within said cavity to said suspension sheet.

2. The apparatus of claim 1, further comprising xerographic printer means for xerographically printing said information card during passage through said apparatus.

3. The apparatus of claim 1, further comprising a bar code on said carrier sheet and further comprising a decoder means in said apparatus configured to decode said bar code.

4. A method for processing information cards housed within a card assembly, said card assembly having (i) a carrier sheet having an aperture, (ii) a suspension sheet affixed to said carrier sheet over said aperture, said suspension sheet and said aperture defining a cavity, and (iii) an information card detachably bonded within said cavity to said suspension sheet, the method comprising the steps of:
   providing an apparatus for passing said card assembly along a prescribed path;
   disposing a magnetic encoder along said path;

disposing a magnetic strip on said information card; and encoding said magnetic strip while passing said card assembly through said apparatus.

5. The method of claim 4, wherein said apparatus comprises xerographic printer means for xerographically printing said information card.

6. The method of claim 4, wherein said apparatus further comprises a bar code decoder for decoding a bar code disposed on said card assembly.

7. The method of claim 4, wherein said carrier sheet further comprises a bar code and wherein said method further comprises the step of decoding said bar code.

* * * * *